Feb. 7, 1950 — G. C. WILHIDE — 2,496,612

SUSPENSION DEVICE

Filed March 22, 1946

INVENTOR.
Glenn C. Wilhide
BY Thomas W. J. Clark
ATTORNEY.

Witness

Patented Feb. 7, 1950

2,496,612

UNITED STATES PATENT OFFICE 2,496,612

SUSPENSION DEVICE

Glenn C. Wilhide, Towson, Md., assignor to The Black and Decker Manufacturing Company, a corporation of Maryland Application March 22, 1946, Serial No. 656,260

9 Claims. (Cl. 172—36)

This invention relates to an improved electric cord support or suspension device for portable power driven tools.

The support is designed so that it may be used in connection with a supplementary suspension apparatus, of which there are numerous varieties. One well known variety includes a rotatable drum, or reel upon which a suspension cable or the electric cord of the tool itself is wound. Associated with the drum is a counter-weight or coil spring which urges the drum in a direction opposite to that in which it must turn to pay out the cable or cord, whereby the counter-weight, or the tension of the spring substantially balances the weight of the tool, the function of the suspension apparatus being to equalize the pull of gravity upon the suspended tool to permit greater ease in the manipulation of the tool in directing its movement in relation to the work.

It is the general practice to use either an independent suspension cable or the electric cord of the tool itself to suspend the tool. When using the independent cable it has in general interfered with the operator in the use of the tool, and as a result more manufacturers have turned to the use of the electric cord for supporting the tool. This arrangement also has certain disadvantages, the strain on the cord adjacent the tool has resulted in breaking the cord and in many instances causing damage to the tool itself, particularly those parts to which the cord may be attached such as the electrical connection and the switch, and it is with the object of preventing this injury that the present invention has been developed.

While the invention is particularly adapted for use with a supplementary suspension apparatus, it is not limited in its use in this connection, but may be employed to advantage with non-suspended tools.

The primary object of the invention is to provide means for eliminating the excess strain on the electric cord adjacent the tool and the parts of the tool to which the electric wires of the cord are attached.

Another object is to provide means whereby the electric cord is normally held downwardly and rearwardly of the tool to reduce interference of the cord with the operator when the tool is being used.

Other objects and advantages of the invention will be apparent from the following description and accompanying drawings forming a part hereof and in which Figure 1 is a perspective view of a portable power driven tool and the improved support in its preferred form.

Figure 3:
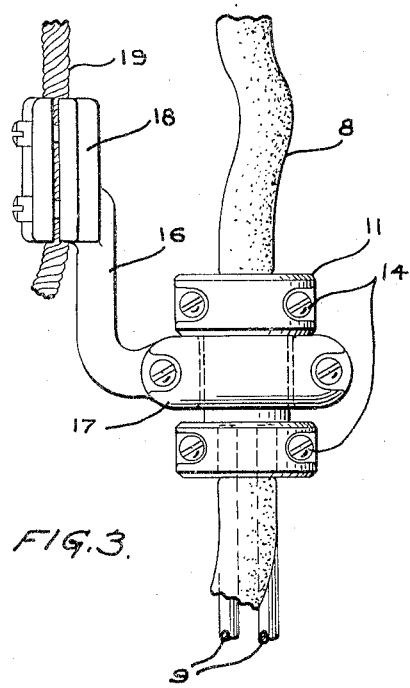
Figure 3 is a fragmentary view of the support in elevation showing the suspension arm in connection with a separate suspension cable.
Figure 2:
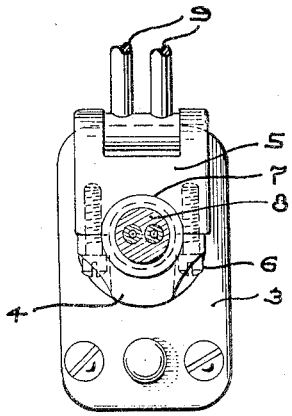
Figure 2 is a plan view of the end cap of the tool, showing the cord in section.
Figure 1:
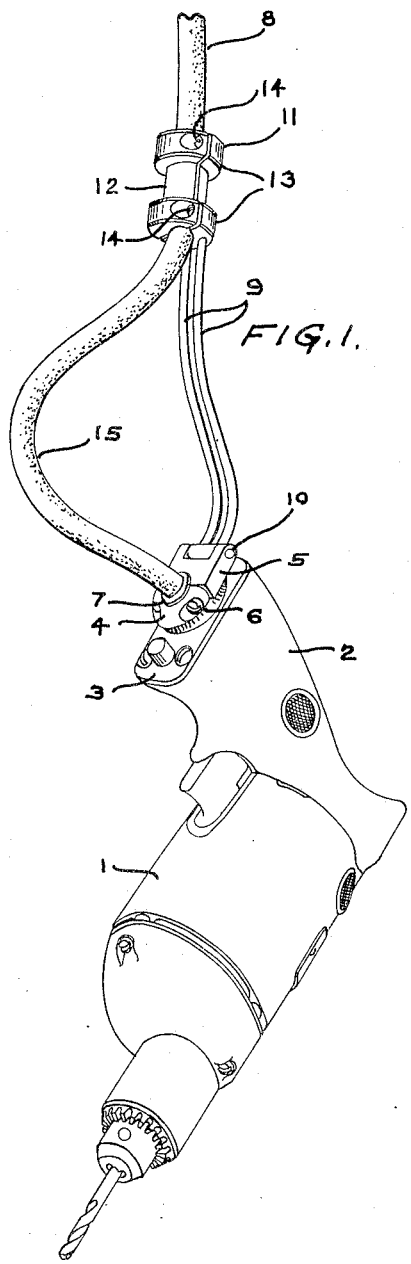

Referring to the drawings by numerals, each of which is used to indicate the same or similar parts in the different figures, the construction shown comprises a portable power driven tool 1, having a handle 2 and an outer end cap 3. The end cap 3 has an integral projecting member or lug 4 extending outwardly from the outer face of the cap. A bracket 5, adjacent the cap, is attached to the lug 4 by screws 6. In an opening between the lug 4 and bracket 5 is an insulating collar 7 through which the electric cord 8 passes.

The bracket 5 has strap members 9 hingedly connected thereto by the pin 10. Rigidly secured to the opposite end of the strap members is the clamp 11 for clamping the cord 8. The clamp 11 is in the form of a split spool having a small central section 12 and two enlarged ends 13. The two halves of the spool are held clamped about the cord 8 by screws 14. The clamp 11 is clamped to the cord 8 at a predetermined distance from the cord outlet, within the collar 7, to allow for a certain amount of slack in the cord between the clamp and the collar as shown at 15.

To obtain the best results the slack should be such as to allow the cord to assume a position substantially in line with the cord opening within the collar 7 when the tool is hanging from the clamp 11. It will be noted that the clamp 11 may be adjusted along the cord 8 to either increase, or decrease the amount of slack in the cord. The proper amount of slack will depend largely upon the direction the cord approaches the tool and the position in which the tool is normally used.

When the device is to be used in connection with a separate suspension cable, the arm 16 is attached to the clamp 11 as shown best in Figure 3, in which the arm 16 is shown as having on one end thereof a collar member 17 which is of such size as to be rotatably clamped about the central section 12 of the clamp member 11. On the other side of the arm is a clamp 18 adapted to be fixedly clamped to a separate suspension cable 19, the purpose of which has been previously explained.

By the application of the present invention, the excess strain on the cord and the connections to which the cord is attached is practically eliminated, whereby the life of these elements may be greatly prolonged, and short circuits avoided.

Because of the location of the strap with respect to the tool and the form of the strap itself, the operator may grasp the handle and use the tool in normal operations without interference from the strap, which is an added feature of the invention.

While the invention has been described in its preferred form, it is not intended that it be limited to this specific structure. What is claimed as new and is desired to be secured by Letters Patent is:

1. A tool support comprising, in combination, an electric power driven hand tool, an electric power cord leading into said tool, a strap member attached at one end to said tool adjacent the cord outlet, a clamp on the other end of said strap member said clamp having means therein to tighten the grip of the clamp upon the cord, to securely clamp the same to said cord at a distance on the cord greater than the length of the strap member whereby the tool may be suspended upon the cord and strap member, the clamp imparting the whole weight of the tool to the cord at a distance substantially removed on the cord from the tool.

2. A tool support comprising, in combination, an electric power driven hand tool, an electric power cord leading into said tool, a semi-rigid strap member hinged at one end to said tool adjacent the cord outlet, a clamp on the other end of said strap member said clamp having means therein to tighten the grip of the clamp upon the cord to securely clamp the same to the cord at a distance on the cord greater than the length of the strap member whereby the tool may be suspended upon the cord and strap member, the clamp imparting the whole weight of the tool to the cord at a distance substantially removed on the cord from the tool.

3. A tool support comprising, in combination, an electric power driven hand tool and a handle projecting from the rear end of the tool, an electric power cord leading into the bottom of said handle, a semi-rigid strap member hingedly connected to said handle adjacent the cord outlet, a clamp on the other end of said strap member said clamp having means therein to tighten the grip of the clamp upon the cord to securely clamp the same to the cord at a distance on the cord greater than the length of the strap member whereby the tool may be suspended upon the cord and strap member, the clamp imparting the whole weight of the tool to the cord at a distance substantially removed on the cord from the tool.

4. A tool support comprising, in combination, an electric power driven hand tool and a handle projecting angularly from the rear end of the tool, an electric power cord leading into the bottom of said handle, a semi-rigid strap member hingedly connected to said handle adjacent the cord outlet and directed outwardly, away from said tool, said hinged connection allowing movement of said strap member only in the plane of the tool and handle, a clamp on the other end of said strap member said clamp having means therein to tighten the grip of the clamp upon the cord to securely clamp the same to the cord at a distance on the cord greater than the length of the strap member whereby the tool may be suspended upon the cord and strap member, the clamp imparting the whole weight of the tool to the cord at a distance substantially removed on the cord from the tool.

5. A tool support comprising, in combination, a portable hand tool having a hand grip, a cap secured to the outer end of said grip, a power conducting cord extending outwardly through said cap, a strap having one of its ends hingedly secured to the cap adjacent the cord outlet, means adjacent the opposite end of said strap for securing the same to the cord at a predetermined distance from the cap member said securing means having means therein to tighten the same upon the cord, whereby the tool may be suspended upon the cord and strap, the securing means imparting the whole weight of the tool to the cord at a distance substantially removed on the cord from the tool.

6. A tool support comprising, in combination, a portable hand tool having a hand grip, a cap member rigidly secured to the outer end of the said grip, a projecting member extending outwardly from said cap, a bracket attached to said member, said member and bracket having therebetween a power cord outlet, a power cord passing therethrough, strap members, one end thereof being hingedly supported by said bracket, and a clamp on the opposite end of the strap members for engaging the said cord at a predetermined distance from the cord outlet on the tool said clamp having means therein to tighten the grip of the clamp upon the cord, whereby the tool may be suspended upon the cord and strap members, the clamp imparting the whole weight of the tool to the cord at a distance substantially removed on the cord from the tool.

7. A tool support comprising, in combination, a portable hand tool having a hand grip, a cap rigidly secured to the outer end of said grip, a power cord projecting from said cap, a projecting member extending outwardly from said cap, strap members having hinged means on one end for attachment to said projecting member and a clamp on the opposite end thereof for engaging the said cord at a predetermined distance from the cord outlet on the tool, the said strap members extending in a rearwardly and downwardly direction in relation to the horizontal axis of the said tool said clamp having means therein to tighten the grip of the clamp upon the cord, whereby the tool may be suspended upon the cord and strap members, the clamp imparting the whole weight of the tool to the cord at a distance substantially removed on the cord from the tool.

8. A tool support comprising, in combination, a portable hand tool having a hand grip, a cap rigidly secured to the outer end of said grip, a power cord extending outwardly through said cap, a bracket attached to said cap, strap members having means on one end thereof hingedly attached to said bracket, a clamp on the opposite end of the strap members for engaging the said cord at a substantial distance from the cord outlet in the cap for maintaining a predetermined amount of slack in the cord between the clamp and the cord outlet said clamp having means therein to tighten the grip of the clamp upon the cord, whereby the tool may be suspended upon the cord and strap members, the clamp imparting the whole weight of the tool to the cord at a distance substantially removed on the cord from the tool.

9. A tool support comprising, in combination, a portable hand tool having a hand grip, a cap secured to the outer end of said grip, a power cord extending outwardly through said cap, a strap member having one of its ends hingedly secured to the cap adjacent the cord outlet, means on the opposite end of said strap member for securing the member to the cord at a predetermined distance from the cap member, said cord securing means having a circumferential recess, an arm member one end of which is adapted to rotatably support said cord securing means at the circumferential recess, and clamping means at the opposite end of the arm for securing the same to a suspension cable.

GLENN C. WILHIDE.

REFERENCES CITED

The following references are of record in the file of this patent:

UNITED STATES PATENTS

| Number | Name | Date |
|---|---|---|
| 1,516,781 | Nylen | Nov. 25, 1924 |
| 1,862,411 | Mackenzie | June 7, 1932 |
| 2,072,551 | Forss | Mar. 2, 1937 |
| 2,205,139 | Gunderson | June 18, 1940 |